United States Patent [19]

Schiele

[11] Patent Number: 5,021,158

[45] Date of Patent: Jun. 4, 1991

[54] PROCESS AND APPARATUS FOR THE SEPARATION OF MIXTURES OF SUBSTANCES

[75] Inventor: Herbert Schiele, Karlsfeld, Fed. Rep. of Germany

[73] Assignee: Krauss-Maffei AG, Fed. Rep. of Germany

[21] Appl. No.: 714,273

[22] Filed: Mar. 21, 1985

[30] Foreign Application Priority Data

Mar. 21, 1984 [DE] Fed. Rep. of Germany ....... 3410423

[51] Int. Cl.[5] .............................................. B01D 21/26

[52] U.S. Cl. .................................... 210/326; 210/329; 210/338; 210/376; 210/380.1; 494/36

[58] Field of Search ............ 210/324, 326, 369, 380.1, 210/256, 315, 337, 338, 342, 297, 329, 376; 494/36

[56] References Cited

U.S. PATENT DOCUMENTS

| | | | |
|---|---|---|---|
| 1,839,941 | 1/1932 | Zelezniak | 210/326 |
| 2,732,073 | 1/1956 | Ruegg | 210/330 |
| 2,755,934 | 7/1956 | Ruegg | 210/376 |
| 2,899,065 | 8/1959 | Irving | 210/300 |
| 2,932,401 | 4/1960 | Thell | 210/326 |
| 3,368,684 | 2/1968 | Ruegg | 210/376 |
| 3,585,132 | 6/1971 | Ruegg | 210/376 |
| 4,014,497 | 3/1977 | Spiewok et al. | 210/380.1 |
| 4,101,421 | 7/1978 | Hultsch | 210/378 |
| 4,109,853 | 8/1978 | Ruegg | 210/369 |
| 4,209,405 | 6/1980 | Christ | 210/376 |
| 4,217,226 | 8/1980 | Kampeen et al. | 210/376 |
| 4,226,724 | 10/1980 | Sturmer | 210/376 |

FOREIGN PATENT DOCUMENTS

| | | | |
|---|---|---|---|
| 468661 | 9/1951 | Fed. Rep. of Germany . | |
| 1030771 | 5/1958 | Fed. Rep. of Germany . | |
| 1822890 | 12/1960 | Fed. Rep. of Germany . | |
| 1119774 | 12/1961 | Fed. Rep. of Germany . | |
| 1852395 | 5/1962 | Fed. Rep. of Germany . | |
| 1873581 | 6/1963 | Fed. Rep. of Germany . | |
| 1209507 | 7/1966 | Fed. Rep. of Germany . | |
| 2656271 | 7/1977 | Fed. Rep. of Germany . | |
| 2603610 | 8/1977 | Fed. Rep. of Germany . | |
| 792920 | 7/1960 | France . | |
| 98244 | 3/1923 | Switzerland | 210/369 |
| 1132400 | 10/1968 | United Kingdom . | |

OTHER PUBLICATIONS

"Kontinuierliche Zentrifugen zur Trennung Fest-Fluessing in der Chemischen Industrie", Verfahrenstechnik 6 (1972) Nr. 1., H. Huelsen.

*Primary Examiner*—W. Gary Jones
*Attorney, Agent, or Firm*—Robert J. Koch

[57] ABSTRACT

Process and apparatus for the separation of mixtures of substances by means of centrifugal forces, particularly for the filtration and/or sedimentation of solids from suspensions, wherein the material mixture is rotated in a cake-forming chamber until a cake of solid particles is formed. The resulting cake may thereafter be washed with a wash liquid, centrifuged and discharged from the cake-forming chamber. Discharge from the cake-forming chamber results in rearrangement of the solid particles of the cake. The cake of the rearranged particles is transferred to at least one further processing chamber and dried by centrifugation before being discharged from the apparatus.

22 Claims, 1 Drawing Sheet

(A)

PROCESS AND APPARATUS FOR THE SEPARATION OF MIXTURES OF SUBSTANCES

BACKGROUND OF THE INVENTION

The present invention concerns a process for the separating mixtures of substances by means of centrifugal forces, particularly for the filtering and/or sedimentation of solids from suspension. The mixture of substances is centrifuged in a cake-forming chamber until a cake of solid particles is formed. The cake may be washed by flooding. A particular feature of the present invention is that, in forming the cake, sedimentation and filtration are effected at the same time and in the same place. The invention also concerns an apparatus for the realization of such a process.

The use of centrifugal forces for the separation of mixtures of substances is well known, particularly in chemistry, pharmacology and processing technologies. The centrifuges used in these processes may be divided fundamentally into installations operating continuously and whose operating discontinuously. In centrifuges operated discontinuously, individual batches of the mixture substances are filled into the centrifuge and processed in succession. In continuously operating centrifuges, the mixture flows continuously and permanently separated material is obtained.

An example of a continuously operating centrifuge is the so-called pusher centrifuge. In this centrifuge, the filter chamber is not closed in the axial direction, and a pusher axially displaces the material in short intervals. The material is thus arranged in varying concentrations along the axis of the centrifuge.

An example of a discontinuous centrifuge is the so-called stripping centrifuge. In this centrifuge, a particular amount of the mixture to be separated is filled into a filter drum at a time. The drum is then rotated until the solid and liquid components of the material are completely separated. The solid cake remaining is stripped from the drum.

Both known centrifuges, the stripper and the pusher centrifuges, have different disadvantages with respect to the requirements arising in the separation of substances.

Pusher centrifuges operate with a filtering chamber that is not closed in the axial direction, so that material mixtures with low solids concentrations cannot be processed in them. If materials with low solids concentrations were used, there would be a danger of overflooding the layers. Furthermore, pusher centrifuges cannot produce filtrates entirely free of solids because no straining clothes can be used. Another disadvantage of pusher centrifuges comprises that they do not permit good separation of mother and wash liquids. In certain cases, the grains (solid particles) may be excessively stressed in pusher centrifuges.

The main disadvantage of stripping centrifuges (with or without siphons) is that the flow rate, and thus the separating capacity, is relatively low. As individual batches must be processed in succession, the rotating velocity of the centrifuge must be altered frequently. This is not only highly labor intensive, but also a waste of energy. Because of the high stripping forces required, the structural cost of such centrifuges is very high. There is also a danger of rattling vibrations. Finally, the processing of grains in stripping centrifuges is not entirely satisfactory, because the stripping blades treat the solid cake in an extremely rough manner.

SUMMARY OF THE INVENTION

It is therefore an object of the present invention to provide an improved process for the separation of mixtures of substances of the general aforementioned type, and an apparatus for realization of such a process. According to the present invention a high rate of materials flow may be obtained and strict standards are maintained with respect to the purity and humidity of the product, clarity of the filtrate, purity of mother and wash liquids, the gentle treatment of grains and freedom from foreign particles.

The process according to the invention for the attainment of this object is characterized in that the cake of solid particles is transferred from a cake-forming chamber into at least one further processing chamber and that the cake is dehumidified by centrifugation in the processing chamber.

The feature of shifting of the solid particles according to the invention is based on the discovery that microstructures (so-called "gores") form in the cake of solids in conventional stripping centrifuges. The capillary forces and the adhesion forces in these microstructures exceed the centrifugal forces, so that the centrifugal forces do not drive the liquid from the solid cake. The gores are rendered more accessible to the wash liquid by means of the rearrangement of the cake according to the invention. Furthermore, so-called blocking layers are formed concentric to the axis of rotation in the solid cake. These blocking layers hinder the separation of the liquids. By means of the rearrangement according to the invention i.e., the loosening and reorientation of the structure of the solid cake, both the detrimental blocking layers and the aforementioned microstructures are dissolved and improved material separation is achieved.

In order to achieve the above object, the apparatus according to the invention is characterized by providing a cake-forming chamber, into which the mixture of substances to be separated is filled. The mixture is at least partially separated in the cake-forming chamber by filtration and/or sedimentation. A cake of solid material is formed during the filtration and/or sedimentation. The present invention is further characterized in that a processing chamber is provided which may be intermittently connected with the cake-forming chamber so that the cake may be transferred.

In a preferred embodiment of the present invention, the cake-forming chamber has an approximately cylindrical configuration and a radius that is smaller than that of the processing chamber. The cake-forming chamber and the processing chamber have the same axis of rotation. In this layout the cake-forming chamber is arranged concentrically within the processing chamber. The solid cake formed in the cake-forming chamber drops radially outward into the processing chamber, and is thus rearranged. The processing chamber is preferably conical over at least part of its axial extent. The material arriving in the conical sections may thus be readily displaced in the direction of a larger diameter terminal section of the processing chamber in the course of centrifuging to dryness. A runway with discharge nozzles is preferably provided in terminal section.

In an advantageous embodiment of the invention, the processing chamber or first member is fastened to a hollow shaft, and the cake-forming chamber mounted on a connecting rod arranged concentrically in the hollow shaft. In this embodiment, the connecting rod may be axially displaced with respect to the hollow shaft. A radially extending push-bottom is provided in the cake-forming chamber. The push-bottom or second member closes off one face of the internal fill space of the cake-forming chamber, while the opposite face is closed by a radially extending drum rim. In this manner, the solid cake formed in the cake-forming chamber drops into the processing chamber by means of a relative motion between the two chambers or portions thereof. The cake may then be centrifuged to dryness in the processing chamber.

This process has the further advantage that the working times of the two chambers may be adjusted differently in accordance with the material mixture to be separated. The desired quality of the product may thus be attained without creating a "back-up" in the centrifuge. If, for example, it is found that centrifuging to dryness requires an excessive amount of time with respect to the processes in the cake-forming chamber, predrying may be achieved in the cake-forming chamber by extended rotation, so that the centrifuging to dryness takes less time. Altogether therefore, the operating parameters, particularly the rotating times and loads, may be adjusted in the individual chambers so that the flow of the material through the centrifuge may be optimized without the creation of a bottleneck.

Further objects, features and advantages of the present invention will become apparent from the detailed description of preferred embodiments, when considered together with the attached figures of drawing.

DETAILED DESCRIPTION OF PREFERRED EMBODIMENTS

Figure 1:
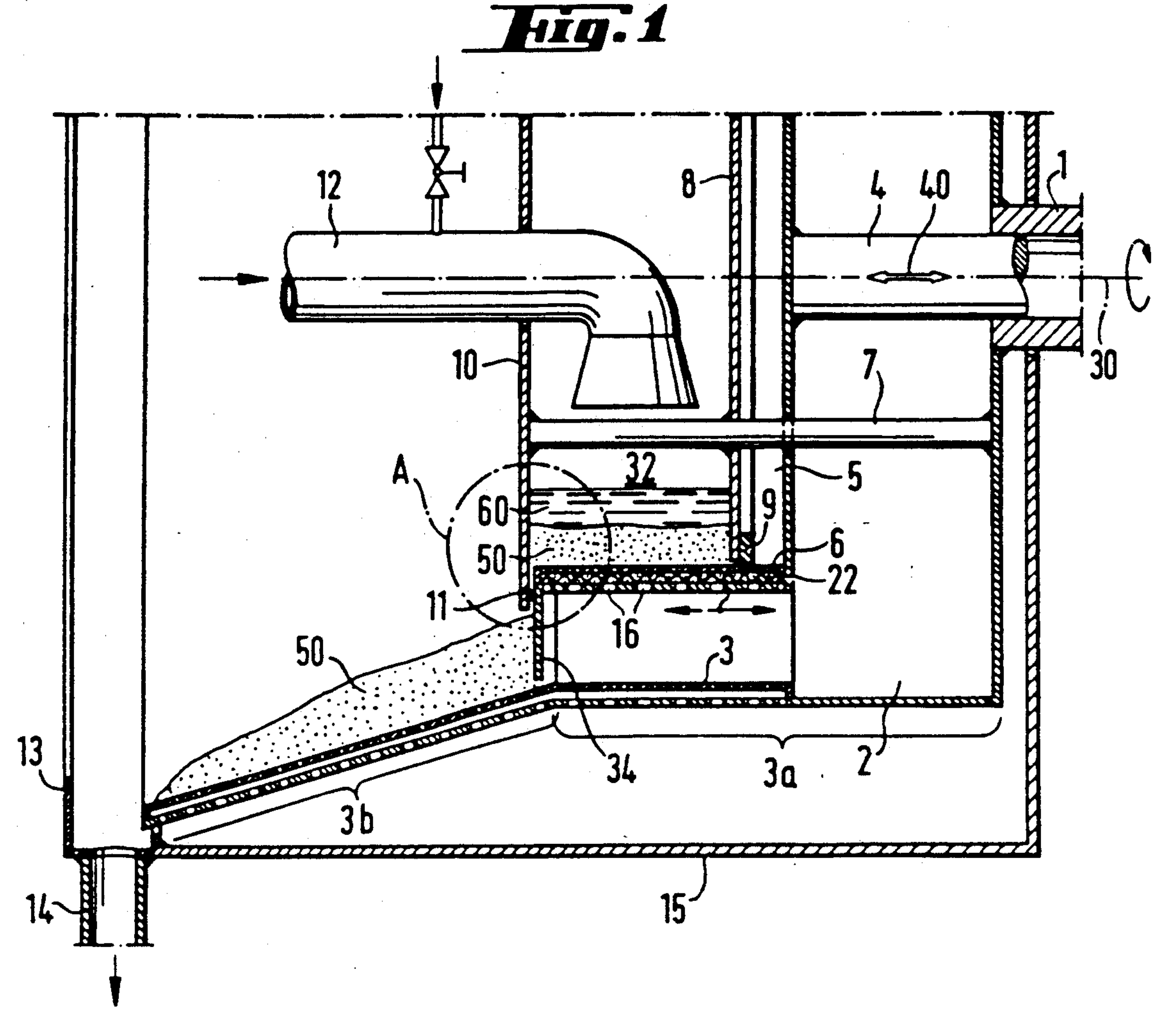
FIG. 1 shows a section through a schematic view of the apparatus.

According to FIG. 1, the centrifuge is in the form of a horizontal centrifuge. The rotating, axially immobile processing chamber 2 is fastened to the hollow shaft 1. The processing chamber 2, in the form of a drum, carries a filter 3. The filter 3 comprises a cylindrical section 3*a* and a subsequent conical section 3*b*. A so-called runway 13 is arranged, together with discharge nozzle 14, at the larger diameter end of the conical section 3*b*.

A filtrate collector housing 15 serves to receive the separated liquid.

A cake-forming chamber 5 is mounted concentrically with the processing chamber 2 on a connecting rod 4 within the hollow shaft 1. The axis of rotation is designated by the reference symbol 30.

In the embodiment shown, the connecting rod 4 rotates with the same rotational speed as the hollow shaft 1, so that the two chambers 2 and 5 have the same angular velocity. The connecting rod 4 may be axially displaced in the direction of the double arrow 40, so that the connected cake-forming-chamber 5 fastened is also axially mobile.

A push bottom 8 having a gasket 9 is stationarily mounted on the processing chamber 2 by mean of a ring of bolts 7. The push bottom 8 tightly closes the internal space 32 of the cake-forming chamber 5 on one axial face. The opposite face of the internal space 32 of the cake-forming chamber 5 is closed off by a drum rim 10, located at a constant distance from the push bottom 8.

Figure 2:
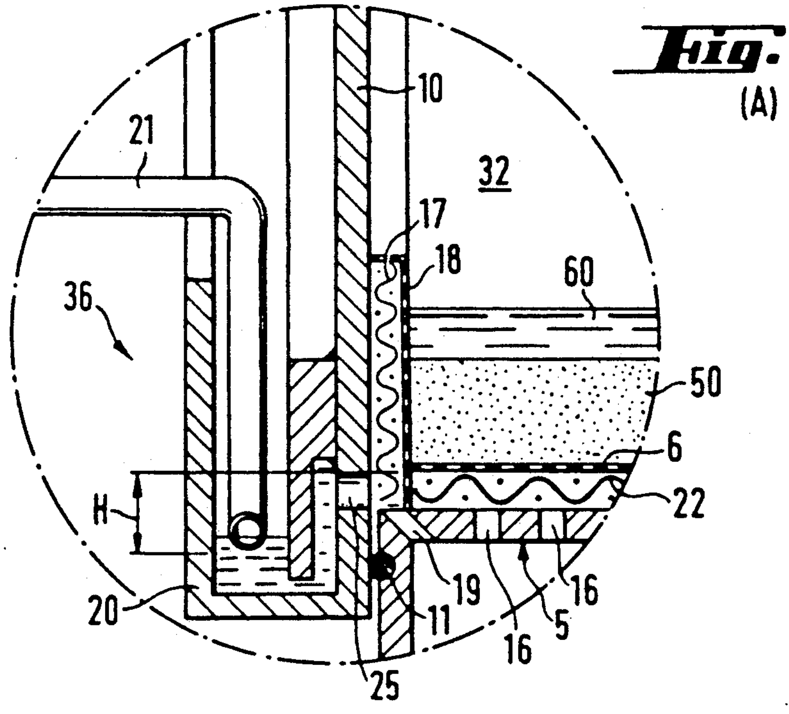
FIG. 2 shows a section through a preferred configuration of the area A outlined in FIG. 1.

The material mixture to be separated is fed into the internal space 32 of the cake-forming chamber 5 through the inlet line 12. The connecting rod 4 is adjusted so that the internal space 32 is closed off tightly by the drum rim 10 and corresponding gasket 11 on the one hand, and by the push bottom 8 and corresponding gasket 9, on the other. A filter 6 in the cake-forming chamber 5 permits the discharge of liquid from the internal space 32, the liquid is collected in the filtrate housing 15. The solid cake 50 is formed in the internal space 32 over the filter 6. The cake 50 may be exposed to a wash liquid from- above. A supporting fabric 22 is inserted to support the filter 6 against the bottom of the cake-forming chamber 5 (FIG. 2).

Following the preliminary separation of a batch in the cake-forming chamber 5, i.e., after filtration/-sedimentation, the formation of a cake, and filling of the chamber 5 the cake may be predried by intermediate centrifuging. The solid cake may then be washed, several times if necessary, with a wash liquid.

The connecting rod 4 is then moved according to the arrow 40, and to the right in FIG. 1. The drum rim 10 and the push bottom 8 remain stationary, so that the solid particle cake 50 drops from the cake-forming chamber 5 into the processing chamber 2. As the solid cake falls from the internal space 32 of the cake-forming chamber 5, the structures formed in the cake (the "gores" or blocking layers) are dissolved and the solid particles rearranged. The connecting rod 4 moves to the right in FIG. 1 until the entire solids batch drops from the internal space 32 of the cake-forming chamber 5 onto the cylindrical section 3*a* of the processing chamber 2. The rod 4 then moves to the left in FIG. 1, whereby the push plate 34 moves the solids accumulating in the cylindrical section 3*a* of the processing chamber 2 to the left in the conical section 3*b* of the processing chamber 2. The solid cake 50 is dried in the processing chamber 2 while the filter 3 permits the passage of the liquid into the filtrate collecting housing 15.

The inclination of the conical section 3*b* of the processing chamber 2 is chosen so that the solid cake may be moved with a slight thrust force in the direction of the runway 13, from whence the solids are removed from the apparatus through the discharge fittings 14.

In FIG. 2, the area A outlined in FIG. 1 is shown in detail. In addition to the known filtration through the bores 16 in the cake-formation chamber 5, a so-called "lateral filtration" may be applied. A support fabric 17 having a sieve 18 is attached to the drum rim 10. The support fabric allows the discharge of excess liquid 60 in the filter chamber through the bores 19.

A siphon system 36 fastened to the drum rim 10 with a (known) siphon plate 20 and a siphon peeler tube 21 allows the discharge of the filtrate through the bores 25 in case of missing or clogged bores 16 in the cake-forming chamber 5. The difference in height H of the liquid column under the sieve 6 of the cake-formation chamber thereby becomes effective.

What is claimed is:

1. An apparatus for centrifugal separation of substances comprising:

first means for defining a closed chamber for partially separating a mixture and forming a cake of solid particles wherein said first means includes a cylindrical wall radially defining said closed chamber and two axially spaced walls enclosing said closed chamber;

means for introducing a mixture into said closed chamber;

second means for defining a continuous flow open chamber integrated with and spatially proximate to said closed chamber;

means for transferring substantially all material in said closed chamber to said open chamber.

2. An apparatus according to claim 1, wherein said first means for defining a closed chamber and said second means for defining an open chamber both comprise filter drums.

3. An apparatus according to claim 1, further comprising means for partially separating a mixture in said closed chamber by filtration.

4. An apparatus according to claim 1, further comprising means for partially separating a mixture in said closed chamber by sedimentation.

5. An apparatus according to claim 1, wherein said closed chamber has a smaller radius than said open chamber, and wherein the closed chamber and said open chamber are arranged to rotate about a common axis.

6. An apparatus according to claim 1, wherein said open chamber exhibits a conical configuration over at least part of its axial extent.

7. An apparatus according to claim 6, further comprising means for inducing a centrifugal force, coupled to said first and second means for defining.

8. An apparatus according to claim 1, further comprising a runway disposed substantially near an open end of said open chamber.

9. An apparatus according to claim 8, further comprising a discharge fitting position of said runway.

10. An apparatus as in claim 1 wherein said means for transferring substantially all material in said closed chamber to said open chamber comprises means for axially displacing portions of said first means for defining said closed chamber and said second means for defining said open chamber to effectuate a material transfer.

11. An apparatus as in claim 1 further comprising:

a first member defining an axial extent of said closed chamber and an axial extent of said open chamber.

12. An apparatus as in claim 1 further comprising:

an axially displaceable second member laterally defining said closed chamber and a push-plate connected to said second member defining an axial extent of said open chamber.

13. An apparatus according to claim 12, wherein said first member is connected to an axially spaced drum rim and push bottom, and further comprising an approximately cylindrical processing chamber surrounding said closed chamber.

14. An apparatus according to claim 13, wherein said push-plate exhibits an outer contour corresponding to said approximately cylindrical processing chamber.

15. An apparatus according to claim 14, wherein said closed chamber has a smaller radius than said open chamber, and wherein the closed chamber and said open chamber are arranged to rotate about a common axis.

16. An apparatus according to claim 15, wherein said means for introducing further comprises an inlet line passing through said drum rim and disposed along said common axis of rotation.

17. An apparatus according to claim 13, further comprising a disk-shaped support fabric disposed against said drum rim and a sieve disposed against said support fabric.

18. An apparatus according to claim 13, further comprising a siphon system having a siphon plate, and a siphon peeling tube, wherein the siphon system is disposed on said drum rim.

19. An apparatus according to claim 12, further comprising means for inducing a centrifugal force, coupled to said first and second means for defining.

20. An apparatus according to claim 12, further comprising:

an axially arranged hollow shaft connected to said first member;

a connecting rod concentrically arranged in said hollow shaft and connected to said second member; and means for axially displacing said connecting rod.

21. An apparatus according to claim 20, further comprising means for inducing a centrifugal force, coupled to said first and second means for defining.

22. An apparatus according to claim 1, further comprising means for inducing centrifugal force, coupled to said first and second means for defining.

* * * * *